(12) United States Patent
Shen et al.

(10) Patent No.: US 11,013,361 B1
(45) Date of Patent: May 25, 2021

(54) SMART MEASURING AND DISPENSING APPARATUS

(71) Applicant: SORRENTO TECHNOLOGY HOLDINGS, Las Vegas, NV (US)

(72) Inventors: Ji Shen, San Diego, CA (US); Brandon Shen, San Diego, CA (US)

(73) Assignee: Sorrento Technologies, Inc., Las Vegas, NV (US)

( * ) Notice: Subject to any disclaimer, the term of this patent is extended or adjusted under 35 U.S.C. 154(b) by 0 days.

(21) Appl. No.: 16/547,500

(22) Filed: Aug. 21, 2019

Related U.S. Application Data (60) Provisional application No. 62/720,316, filed on Aug. 21, 2018.

(51) Int. Cl.
*A47J 31/40* (2006.01)

(52) U.S. Cl.
CPC .................................... *A47J 31/40* (2013.01)

(58) Field of Classification Search
CPC .................................. A47J 31/40; A47J 31/42
See application file for complete search history.

(56) References Cited

U.S. PATENT DOCUMENTS

| | | | | |
|---|---|---|---|---|
| 5,635,233 | A * | 6/1997 | Levinson | A23F 3/18 426/433 |
| 5,865,383 | A * | 2/1999 | Ford | A47J 42/40 241/100 |
| 5,908,144 | A * | 6/1999 | Dalton | G01F 13/006 222/185.1 |
| 6,725,763 | B2 * | 4/2004 | Cai | A47J 27/2105 99/287 |
| 8,621,982 | B2 * | 1/2014 | Nosler | A47J 31/36 99/289 R |
| 8,820,219 | B2 * | 9/2014 | Buehler | A47J 44/00 99/334 |
| 9,357,871 | B2 * | 6/2016 | Coccia | A47J 31/36 |
| 2014/0106042 | A1 * | 4/2014 | Nosler | A23F 5/262 426/433 |
| 2015/0157039 | A1 * | 6/2015 | Nosler | A23F 5/262 426/433 |

OTHER PUBLICATIONS

Wikimedia Foundation, Wikipedia.org, Burr Mill, (Nov. 5, 2019), San Francisco, CA, US, available at https://en.wikipedia.org/wiki/Burr_mill.
Whole Latte Love, Espresso Grinders, (Nov. 5, 2019), Rochester, NY, US, available at https://www.wholelattelove.com/collections/espresso-grinders.
Whole Latte Love, Mazzer Kony Coffee Grinder in Black, (Nov. 5, 2019), Rochester, NY, US, available at https://www.wholelattelove.com/collections/espresso-grinders/products/mazzer-kony-electronic-grinder-in-black.
Verizon Media, Engadget.com, PantryChic's Bluetooth Ingredient Dispenser is for Lazy, Type-A Bakers, (Nov. 5, 2019), New York, NY, US, available at https://www.engadget.com/2014/07/28/pantrychic/.

* cited by examiner

*Primary Examiner* — Rina I Duda
(74) *Attorney, Agent, or Firm* — Insigne PC (57) ABSTRACT

The present disclosure, a smart measuring and dispensing apparatus, generally relates dosers that assist in measuring the amount of a given substance, liquid or solid. The present disclosure aims to reduce time, space, and effort required to measure the amount of a substance, and focuses on the measuring of foodstuffs, ingredients such as salt, pepper, herbs, spices, oils, vinegars, condiments, etc., with a handheld apparatus.

20 Claims, 11 Drawing Sheets

SMART MEASURING AND DISPENSING APPARATUS

CROSS-REFERENCE TO RELATED APPLICATION

The present application claims priority to U.S. Provisional Patent Application No. 62/720,316, filed Aug. 21, 2018 entitled "SMART MEASURING AND DISPENSING APPARATUS," the entire disclosure of which is incorporated by reference herein.

FIELD OF INVENTION

The present disclosure relates to an apparatus for measuring and dispensing a solid or liquid substance in specific amounts such as an automatic dosers.

DESCRIPTION OF RELATED ART

When cooking, whether professionally or at home, measuring and dispensing the specific amount of an ingredient (such as salt, pepper, spices, oils, vinegar, wine, etc.) is important. Liquids like oils (vegetable, cooking wine, vinegar, etc.) are often given a suggested portion in various recipes. Since most recipes are developed by experienced chefs who have experimented with varying amounts of the ingredients, following the suggested amount of the ingredients is recommended. However, the only way of accurately measuring and dispensing a precise amount of ingredient is using a measuring tool (e.g., measuring spoon, measuring cup, scale). While this method is sufficient for measuring some ingredients, the use of measuring tools can become cumbersome, messy, and a chore for other ingredients.

Another problematic situation, which occurs in many grocery stores, is the dispensing of bulk foodstuffs (such as coffee, nuts, beans, etc.). Such dispensing is almost always imprecise and sometimes messy. A customer in this situation is required to visually estimate the weight of foodstuff dispensed into a bag and then weigh the foodstuff on a scale, usually located at the end of the bulk foodstuff aisle. If the customer determines that he or she has dispensed too much foodstuff by weight, he or she has little recourse to remove excess foodstuff from his or her bag.

Given the foregoing, there is a need for a smart measuring and dispensing apparatus that would be precise, efficient, and convenient.

SUMMARY OF THE INVENTION

In an embodiment of the invention the smart measuring and dispensing apparatus comprises a base; a grinder housed within the base; a motor connected to the grinder; a power source connected to the motor; and a counting module connected to the power source; wherein the counting module comprises at least one processor; and at least one memory including computer program code for one or more programs, the at least one memory and the computer program code configured to, with the at least one processor, cause the apparatus to perform at least the following: turn the motor on or off; and determine the amount of material to be dispersed from the apparatus. In certain embodiments the smart measuring and dispensing apparatus further comprises an amount adjustment switch connected to the counting module, wherein the amount adjustment switch has at least two selectable settings, wherein the counting module causes the apparatus to disperse the amount of material corresponding to the selected setting. In certain embodiments the smart measuring and dispensing apparatus further comprises a power switch, wherein the power switch is connected to the power source; a container, wherein the container is coupled to the base; and a material feeder, housed within the container.

In another embodiment of the invention the smart measuring and dispensing apparatus comprises a base; a pump housed within the base; a passage connected to the pump; a power source connected to the pump; and a counting module connected to the power source and pump; wherein the counting module comprises at least one processor; and at least one memory including computer program code for one or more programs, the at least one memory and the computer program code configured to, with the at least one processor, cause the apparatus to perform at least the following: turn the motor on or off; and determine the amount of material to be dispersed from the apparatus. In certain embodiments the smart measuring and dispensing apparatus further comprises an amount adjustment switch connected to the counting module, wherein the amount adjustment switch has at least two selectable settings, wherein the counting module causes the apparatus to disperse the amount of material corresponding to the selected setting. In certain embodiments the smart measuring and dispensing apparatus further comprises a power switch, wherein the power switch is connected to the power source; a container, wherein the container is coupled to the base; and a material feeder, housed within the container.

In another embodiment of the invention the smart measuring and dispensing apparatus, the apparatus comprises a base; a grinder housed within the base; a motor connected to the grinder; a power source connected to the motor; a counting module connected to the motor and the power source; an actuator connected to the counting module; a gate connected to the actuator; and a receptacle connected to the base, wherein the counting module comprises at least one processor; and at least one memory including computer program code for one or more programs, the at least one memory and the computer program code configured to, with the at least one processor, cause the apparatus to perform at least the following: turn the pump on or off; determine the amount of material to be dispersed from the apparatus; and activate the actuator. In certain embodiments the smart measuring and dispensing apparatus further comprises an amount adjustment switch connected to the counting module, wherein the amount adjustment switch has at least two selectable settings, wherein the counting module causes the apparatus to disperse the amount of material corresponding to the selected setting. In certain embodiments the smart measuring and dispensing apparatus further comprises a power switch, wherein the power switch is connected to the power source; a container, wherein the container is coupled to the base; and a material feeder, housed within the container.

In certain embodiments, the present disclosure solves the aforementioned problems by comprising a grinder, motor, power source, counting module, amount adjustment switch, and container. Material to be ground by the grinder is fed through an opening of the container. The feeding of material can be accomplished by gravity and/or some other mechanically induced force. Materials are fed to the grinder through an opening, which can vary in size. The motor is connected to the power source and the counting module. The counting module, which may be configured to count time or the number of revolutions made by a grinder, controls the amount of material to be ground and dispensed. In further embodiments, the apparatus is configured to be handheld, with a power switch accessible to one of the user's fingers. Therefore, for example, the user of the apparatus can conveniently dispense freshly ground peppercorns in a specific amount with the press of a button and avoid the use of separate tools like a pepper mill and a measuring spoon.

In other embodiments, the present disclosure further comprises a pump, spout and container suitable for dispensing liquid or liquid-like materials. Therefore, for example, the user of the apparatus can conveniently dispense oil or a condiment such as mustard, with the press of a button and without resort to a tool like measuring spoon.

In other embodiments, the present disclosure further comprises an electronic sensor, such as a scale or liquid sensor. The electronic sensor can be disposed along the base of a receptacle, or "buffer" chamber, that collects a proper amount of material before dispensing.

The foregoing, and other features and advantages of the invention, will be apparent from the following, more particular description of the preferred embodiments of the invention, the accompanying drawings, and the claims. Other advantages and variants would be readily apparent to one skilled in the art and are within the scope of the invention.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages can be understood by referring to FIGS. 1-11, wherein like reference numerals refer to like elements.

As used in this specification, the singular forms "a," "an," and "the" include plural referents unless the context clearly dictates otherwise. For example, the term "a grinder" is intended to mean a single grinder or a combination of grinders, and "a counting module" is intended to mean a single counting module or a combination of counting modules.

While the present disclosure, in many embodiments, is configured to dispense a variety of foodstuffs, whether they be liquid, liquid-like, solid, or solid-like, the present disclosure can, in further embodiments, accommodate the dispensing of other materials including, but not limited to, pharmaceuticals, manufacturing materials (such as glues, sealants, paints, etc.), and/or crafting materials (such as beads, glues, paints, etc.). As used herein, "material" refers to any of the aforementioned foodstuffs or other materials.

As used herein, "amount" includes any amount within a certain range of accuracy that can be determined and/or limited by a person or machine including, but not limited to, the operator of the apparatus, the manufacturer of the apparatus, and/or any of the machines that manufacture a part or the whole of the apparatus. Further, "amount" can include measurements of mass or volume. For example, amount can refer to grams, liters, ounces, fluid ounces, or any scaled unit thereof.

As used in this specification, a "network" includes any method, means, system, and/or modality by which electronic components may communicate with each other, which includes, but is not limited to, a circuit, a circuit board, a motherboard, Wi-Fi, Bluetooth, a communication interface, a Universal Serial Bus (USB) port, Near Field Communications (NFC), a cellular radio, and/or wired local area network (LAN).

As used in this specification, a "connection" between electronic components or electrically-powered components includes a communication between components. The connection need not be direct and includes, in some embodiments, an indirect connection between two components whereby one or more other components are connected and placed in between the two components as in a path along a circuit.

Figure 1:
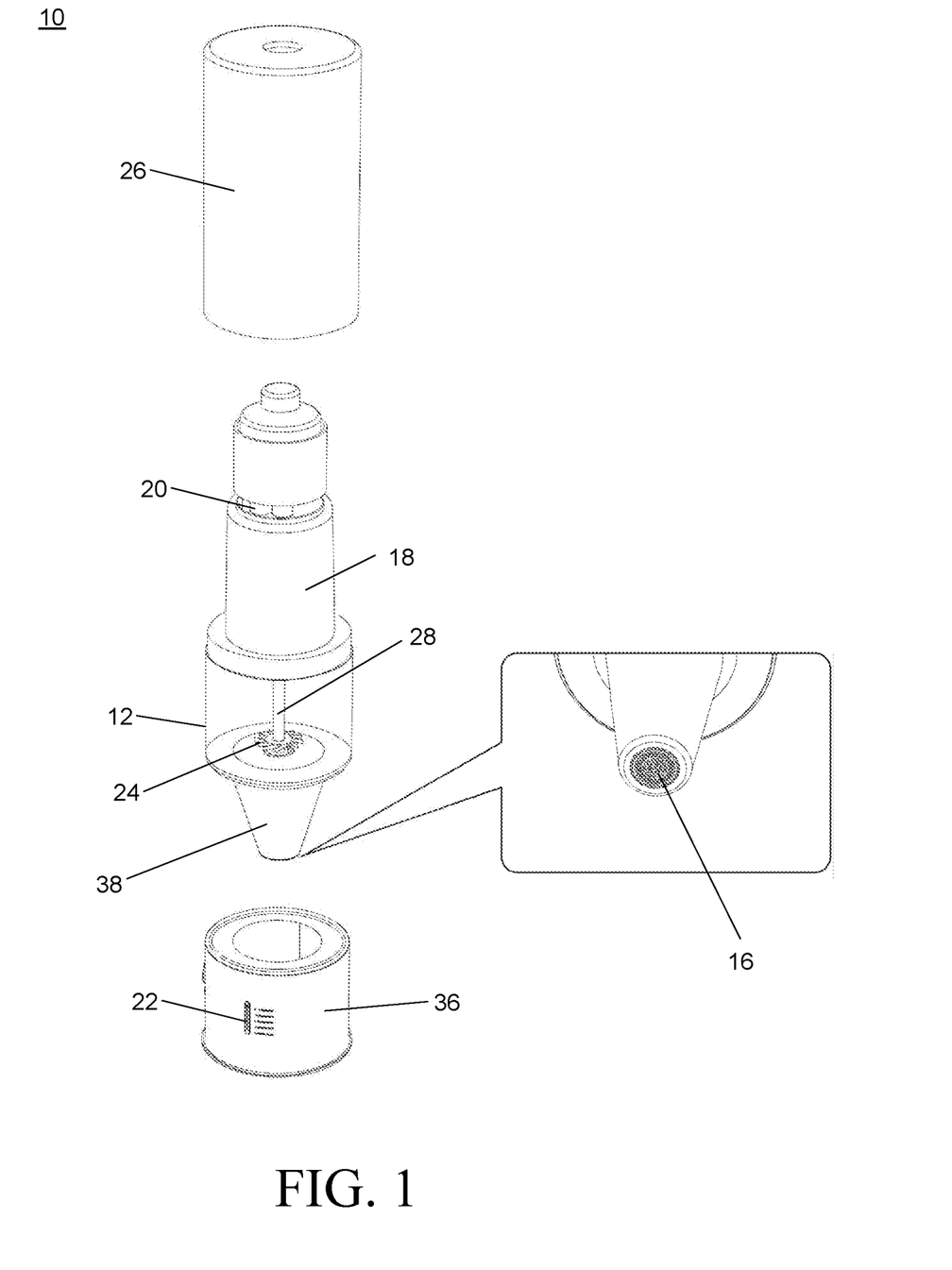
FIG. 1 illustrates an exploded perspective view of the smart measuring and dispensing apparatus according to an embodiment.

FIG. 1 shows a perspective exploded view of the present disclosure according to one embodiment. The apparatus 10 comprises a container 12 a motor cover 18, a grinder 16, a motor housed inside the motor cover 18, a power source 20, a counting module housed inside the motor cover 18, an amount adjustment switch 22, a material feeder 24, an assembly cover 26, and a base 36. Material to be ground by the grinder 16 is fed through an opening (not shown) of the container 12. The opening is of suitable size for feeding the grinder 16. The motor is connected to the power source 20, to the counting module, and to the grinder 16. The amount adjustment switch 22 is connected to the counting module. The material feeder 24 is connected to the motor by an axle 28. Any connections to and/or between any of the components of the apparatus, such as to the motor or to the amount adjustment switch, can be wired or wireless and are readily achieved by a person of ordinary skill in the art.

While shown as substantially cylindrical in FIG. 1, the container 12, in other embodiments, can be constructed to substantially resemble any shape including, but not limited to, a cuboid, a cone, or sphere, or any combination thereof. For example, the container can take the shape of a traditional hopper or pepper mill. In one embodiment, the container can be an actual off-the shelf hopper or pepper mill. The container is configured to suitably hold a given foodstuff. In other embodiments, the apparatus comprises a plurality of containers. In further embodiments, the container can be interchanged with another container that holds a different material. The opening of the container 12 is suitably situated and/or connected to the grinder to allow material to enter the grinder.

The grinder 16 of FIG. 1, can comprise any type of grinder suitable for creating a more granular version of a particular solid or particular selection of solids. Such grinder types can include, but are not limited to, burr grinders, blade grinders, or herb grinders. In FIG. 1, the grinder 16 is partially enclosed by a grinder cover 38. The grinder cover 38 is substantially conical and allows material to be channeled from its wider end towards its narrower end. In other embodiments, the grinder cover can comprise other shapes other than substantially conical. The grinder cover 38 also assists in having parts of the apparatus, when detachably connected together, to stand upright within the base 36. In further embodiments, some or all the parts of the apparatus are detachably connected. Such detachable connections ease certain tasks such as cleaning, maintenance, and/or filling. The creation of detachable connections suitable for the ease of filling the container, changing the power source, and/or cleaning the grinder, for example, would be readily apparent to a person of ordinary skill in the art.

In another embodiment, the grinder 16 can comprise multiple grinding components to facilitate the grinding process. In one embodiment, the grinder has at least some of its grinder components situated substantially adjacent to and/or in both the wider end and narrow end of the grinder cover 38. In other embodiments, the grinder can be entirely situated substantially adjacent to and/or in either the wider end or narrower end of the grinder cover 38.

The motor of FIG. 1, can comprise any electric motor suitable for operating a grinder. Such motors are known to persons of ordinary skill in the art. The motor rotates at least one component of the grinder 16. In other embodiments, the motor is connected to a power source 20, to a counting module, and/or to the grinder, or any combination thereof. The power source 20 of FIG. 1 comprises two AA batteries, and is connected to the counting module and motor. In other embodiments, the power source 20 can be any electric power source, including, but not limited to household AC power and/or household batteries (such as 1.5-volt, 9-volt batteries, etc.).

The counting module comprises at least one processor, and at least one memory including computer program code for one or more computer programs, the at least one memory and the computer program code configured to, with the at least one processor, cause, at least in part, the motor to power the grinder. The counting module can be configured to control the duration of the motor according to preset modes. The modes can correspond to amounts of desired materials. In other embodiments, the counting module can be configured to control the duration of the motor according to a pre-set count of revolutions made by the grinder. The pre-set modes may be selected by the user via an amount adjustment switch 22. Design and assembly of the counting module is readily apparent to a person of ordinary skill in the art.

The amount adjustment switch 22 of FIG. 1 is a slider switch comprising a printed scale that allows the user to set the switch to a desired position in order for the apparatus to dispense a set amount of material. In other embodiments, the amount adjustment switch 22 can comprise other types of switches, including, but not limited to, push-button, blade, rotary potentiometer, toggle, rocker, keypad, and/or multi-way tactile switches. In further embodiments, the amount adjustment switch 22 may be in the form of software on a mobile device or computer, which communicates wirelessly via a network with other components of the apparatus. Other embodiments comprise more than one amount adjustment switch. For example, in an embodiment, there can be five push-button amount adjustment switches, with each push-button causing the apparatus to dispense corresponding amounts. For example, the first push-button causing the apparatus to dispose one gram and the second push button causing the apparatus to dispose two grams and so on. A wide selection of dispensing amounts can be envisioned by a person of ordinary skill in the art.

The material feeder 24 of FIG. 1, is comprised of a sprocket that assists in moving material towards the grinder and/or through the opening of the container 12. The material feeder 24 is suitably situated within the container in order to move material towards the grinder 16. Gravity also assists in moving the material into the grinder 16. In other embodiments, the material feeder can comprise any means suitable for assisting in the movement of material towards the grinder and/or through the opening of the container. Such means include, but are not limited to, pneumatic pressure, screws, belts, and/or vibrations.

The assembly cover 26 of FIG. 1, covers and protects components of the apparatus. In one embodiment, the assembly cover 26 locks into place. In another embodiment, the assembly cover 26 is twisted to engage with threads on the container 12 to secure the assembly cover 26 to the container 12. The assembly cover 26 of FIG. 1 is substantially cylindrical, which allows a human hand to comfortably grasp the apparatus. In other embodiments, the assembly cover can comprise another shape or a variety of shapes. In another embodiment, the assembly cover comprises finger-shaped grooves disposed on its surface to provide a contoured fit for a hand.

The base 36 of FIG. 1, covers and protects components of the apparatus. The base 36 allows the apparatus to stand upright on a flat surface. The base 36 is substantially cylindrical in shape, but can comprise other shapes.

In further embodiments, an apparatus comprising a grinder, a motor, a power source, a counting module, an amount adjustment switch, and a material feeder 24 may connect and/or communicate with each other via a network in any combination.

Figure 2:
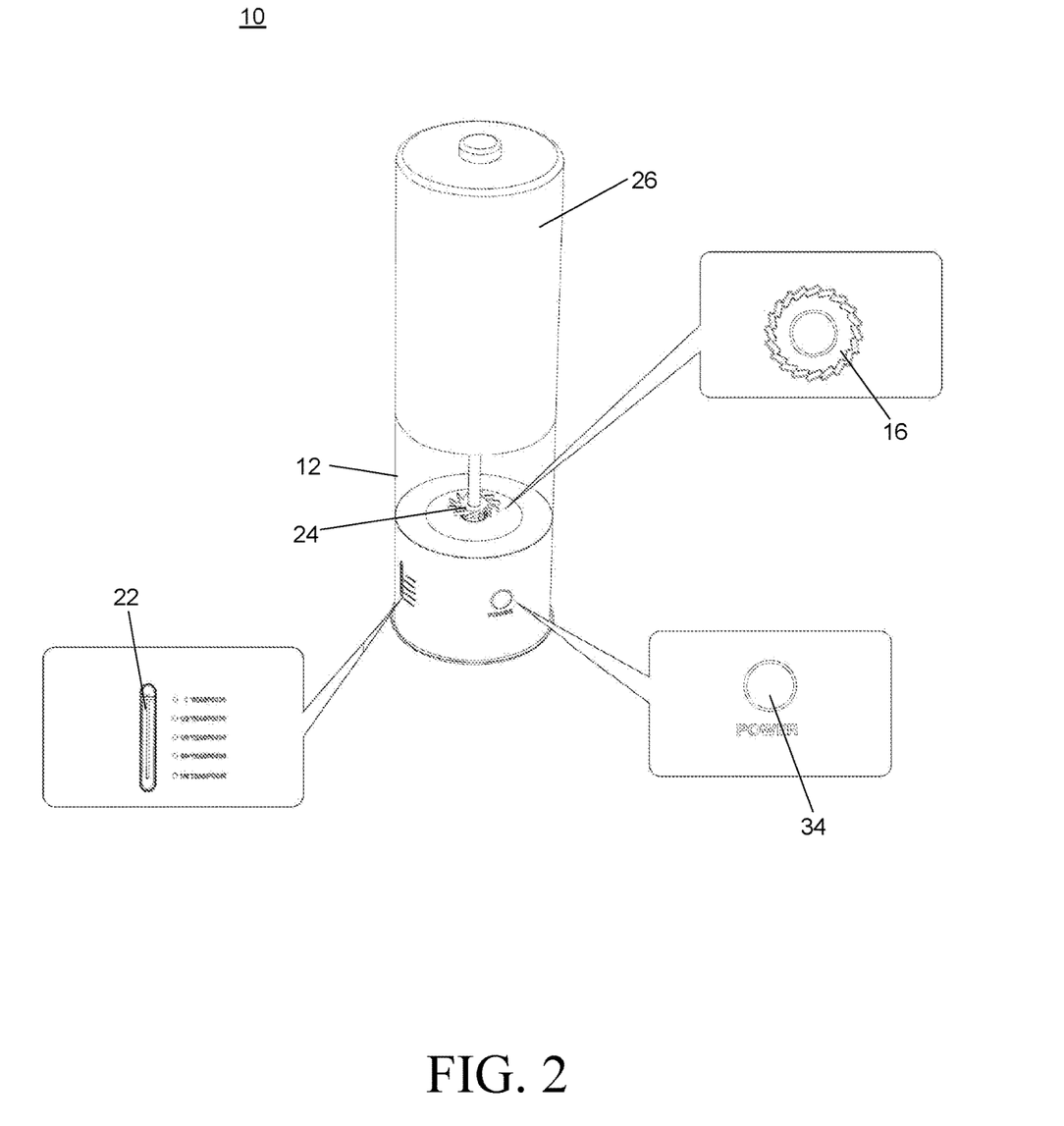
FIG. 2 illustrates a perspective view of the smart measuring and dispensing apparatus according to an embodiment.

FIG. 2 depicts a perspective view of the present disclosure according to an embodiment. The apparatus 10 comprises a container 12, a grinder 16, a motor housed inside the assembly cover 26, a power source housed inside the assembly cover 26, a counting module housed inside the assembly cover 26, an amount adjustment switch 22, a material feeder 24, an assembly cover 26, and a power switch 34. Material to be ground by the grinder 16 is fed through an opening (not shown) of the container 12. The opening is of suitable size for feeding a given material to the grinder 16. The motor is connected to the power source and to the counting module. The amount adjustment switch 22 is connected to the counting module. The material feeder 24 is connected to the motor by an axle 28. The power switch 34 is connected to the motor. Any connections to and/or between any of the components of the apparatus, can be wired or wireless and are readily achieved by a person of ordinary skill in the art.

The power switch 34 of FIG. 2, when pressed, allows the apparatus to be powered and to dispense the amount of material determined by the amount adjustment switch 22. The power switch 34 in FIG. 2, comprises a push button, but other embodiments can comprise other types of switches that include, but are not limited to, push-button, toggle, and/or rocker switches. The dispensing of the amount of material determined by the amount adjustment switch is repeatable until an insufficient amount of material remains.

Figure 3:
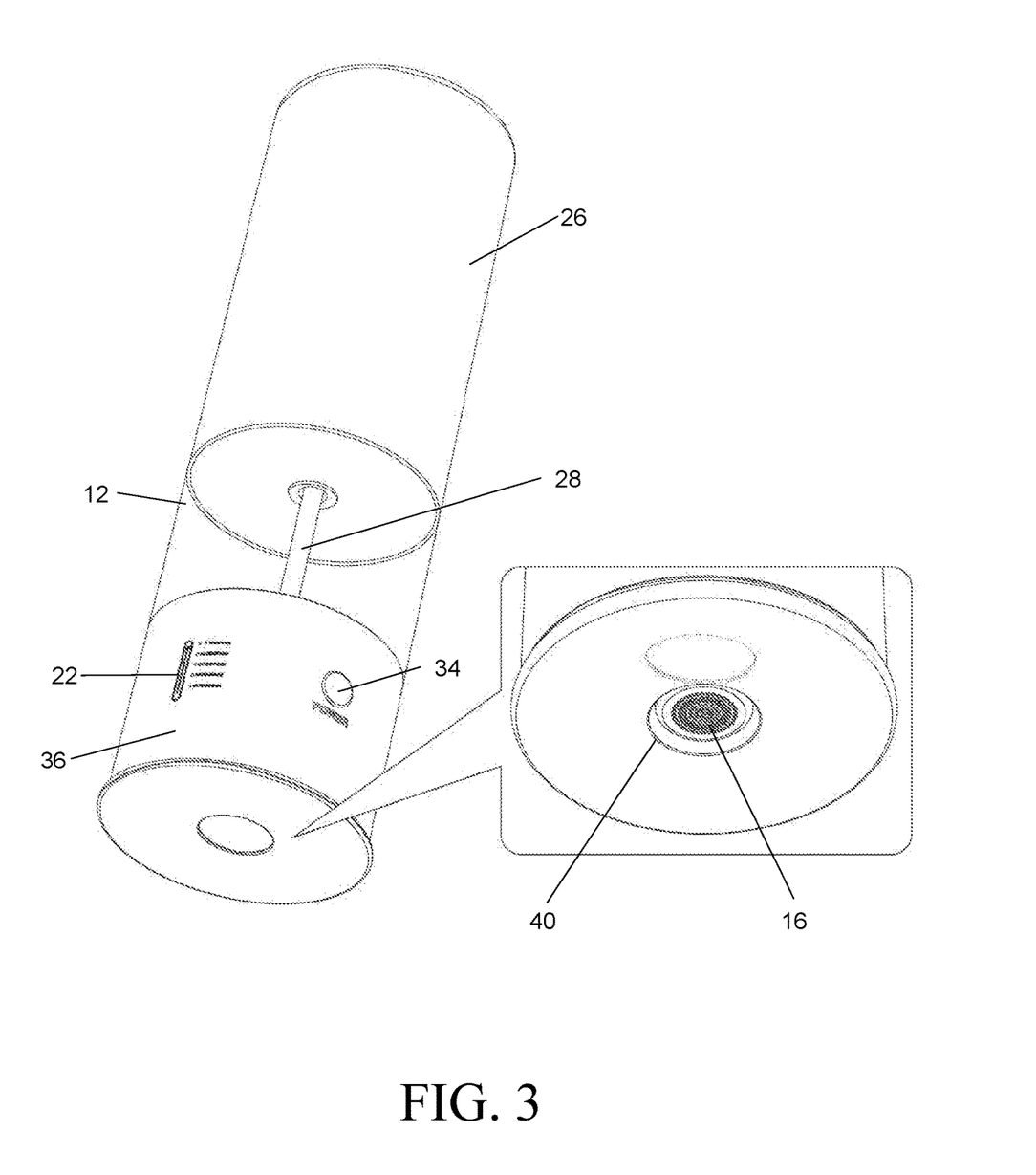
FIG. 3 illustrates a perspective view of the smart measuring and dispensing apparatus according to an embodiment.

FIG. 3 depicts a perspective view of the present disclosure. The apparatus 10 comprises a container 12, a grinder 16, an assembly cover 26, a motor housed inside the assembly cover 26, a power source housed inside the assembly cover 26, a counting module housed inside the assembly cover 26, an amount adjustment switch 22, a power switch 34, and a base 36. Material to be ground by the grinder 16 is fed through an opening (not shown) of the container 12. The motor is connected to the power source and to the counting module. The amount adjustment switch 22 is connected to the counting module. The material feeder 24 is connected to the motor by an axle 28. The power switch 34 is connected to the motor. Any connections to and/or between any of the components of the apparatus can be wired or wireless and are readily achieved by a person of ordinary skill in the art.

The base 36 of FIG. 3 comprises a passage 40 that allows material exiting the grinder to exit the base 36. The passage 40 which allows the dispensed material to be directly deposited upon a desired object or objects. For example, in some embodiments, the passage 40 allows peppercorns, freshly ground by the grinder, to be directly deposited on food or to be directly deposited into a mise en place container for later use.

Figure 4:
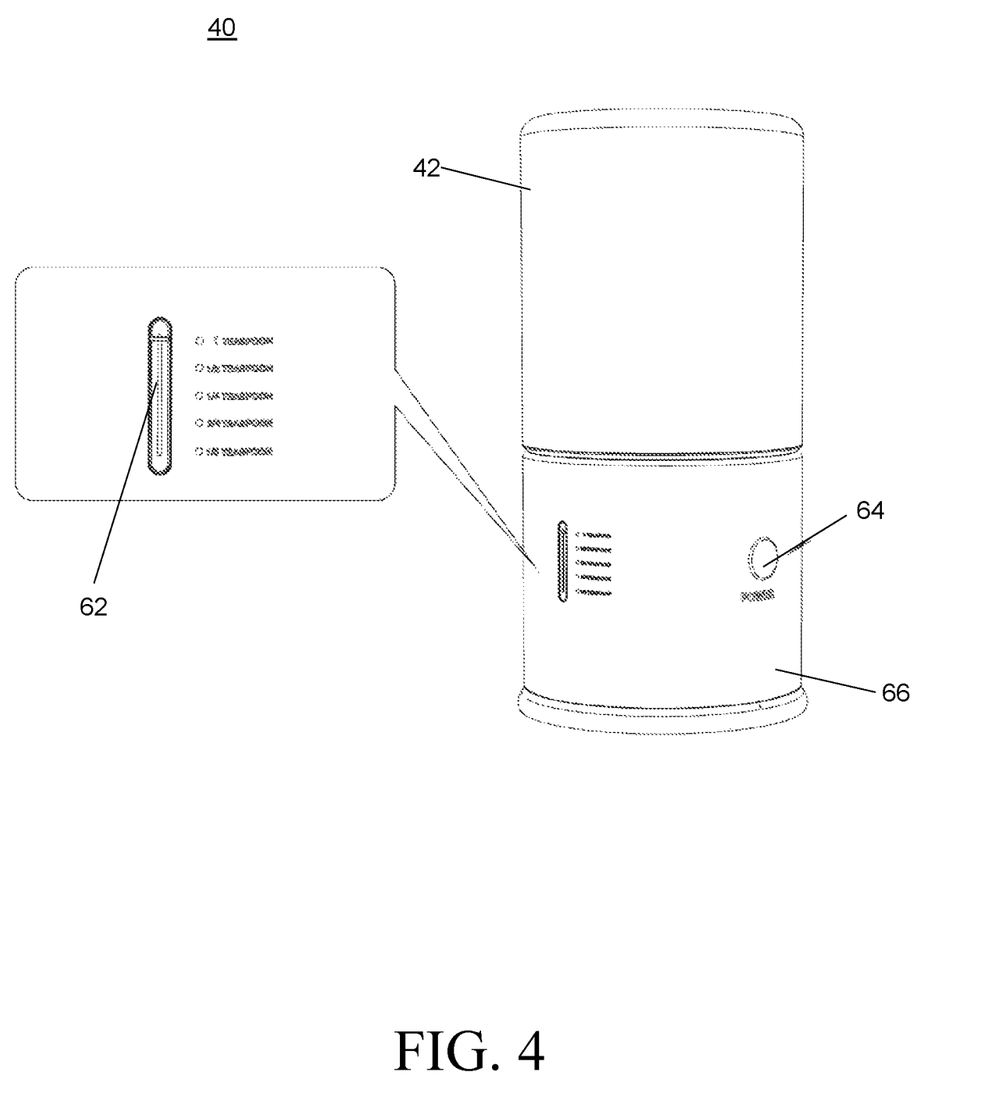
FIG. 4 illustrates a side view of the smart measuring and dispensing apparatus according to an embodiment.

FIG. 4 shows a side view of the of the present disclosure according to one embodiment. The apparatus 40 comprises a container 42, a grinder housed inside the base 66, a motor housed inside the base 66, a power source housed inside the base 66, a counting module housed inside the base 66, an amount adjustment switch 62, a power switch 64, and a base 66. Material to be ground by the grinder is fed through an opening (not visible) of the container 42. The motor is connected to the power source and to the counting module. The amount adjustment switch 62 is connected to the counting module. Any connections to and/or between any of the components of the apparatus can be wired or wireless and are readily achieved by a person of ordinary skill in the art.

Figure 5:
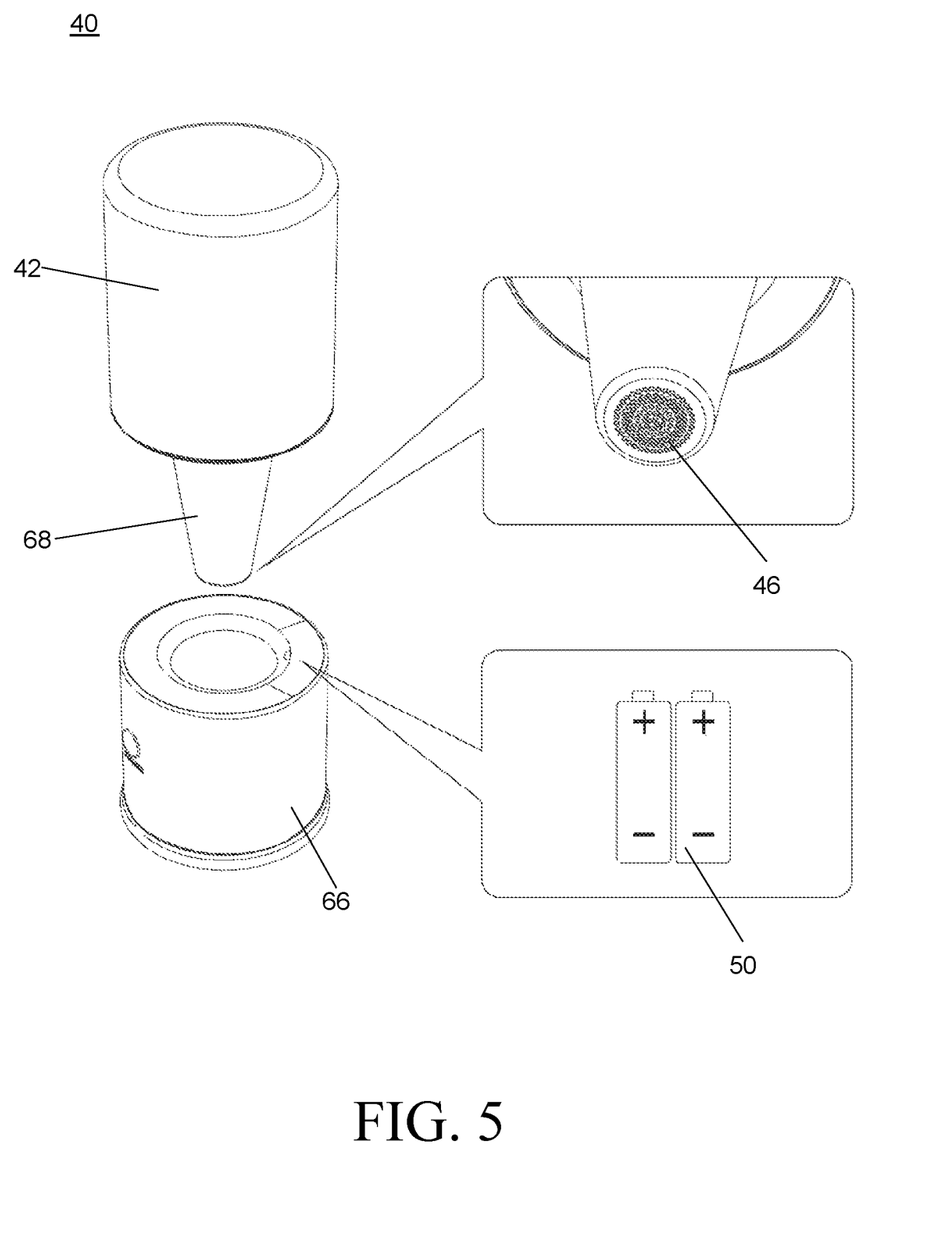
FIG. 5 illustrates an exploded perspective view of the smart measuring and dispensing apparatus according to an embodiment.

FIG. 5 depicts a perspective exploded view of the present disclosure according to an embodiment. The apparatus 40 comprises a power source 50, which is comprised of two AA batteries and is located in the base 66. The grinder cover 68 is substantially conical in shape. The grinder 46 is situated substantially adjacent to and/or in the narrower end of the grinder cover 68. In the embodiment of FIG. 5, the container 42, the grinder 46, and the grinder cover 68, are detachable as a unit from the base 66 for ease of cleaning and/or maintenance.

Figure 6:
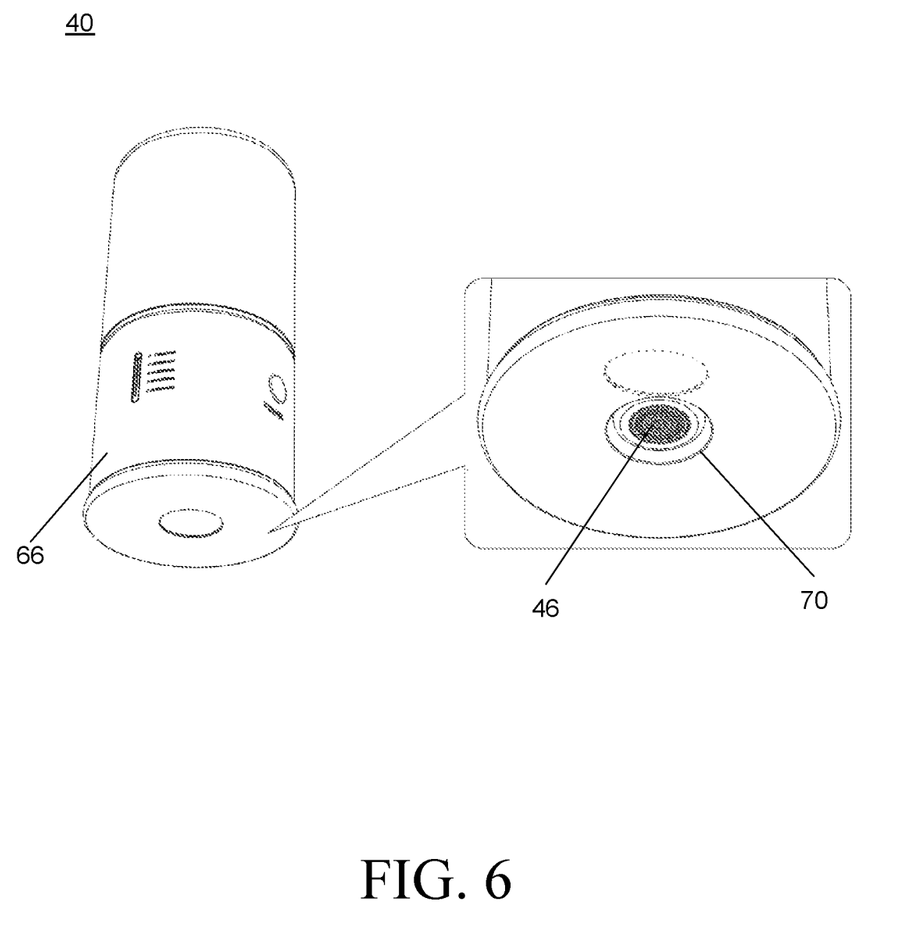
FIG. 6 illustrates a perspective view of the smart measuring and dispensing apparatus according to an embodiment.

FIG. 6 depicts a perspective view of the present disclosure according to an embodiment. The apparatus 40 comprises a base 66, which comprises a passage 70 that allows material exiting the grinder 46 to exit the base 66. The passage 70 allows the dispensed material to be directly deposited upon a desired object or objects. For example, in some embodiments, the passage allows peppercorns freshly ground by the grinder, to be directly deposited on food or to be directly deposited into a mise en place container for later use.

Figure 7:
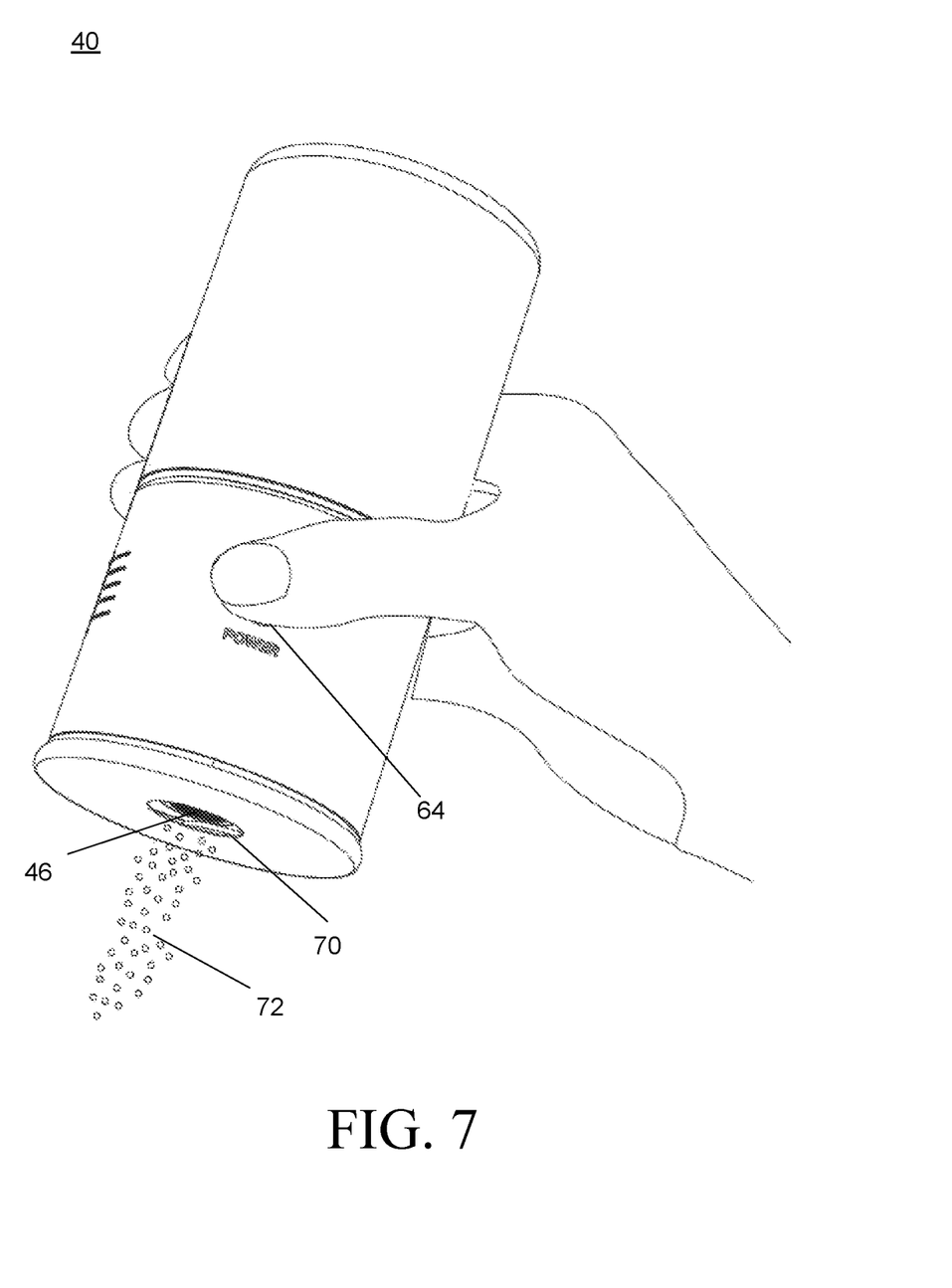
FIG. 7 illustrates a perspective view of the smart measuring and dispensing apparatus according to an embodiment.

FIG. 7 depicts a perspective view of the present disclosure according to an embodiment. In FIG. 7, the apparatus 40 dispenses granular material 72 as it exits the grinder 46 and passes through the passage 70. This dispensing occurs as the power switch 64 is pressed by the user's thumb and the entire apparatus is held by the user's hand.

Figure 8:
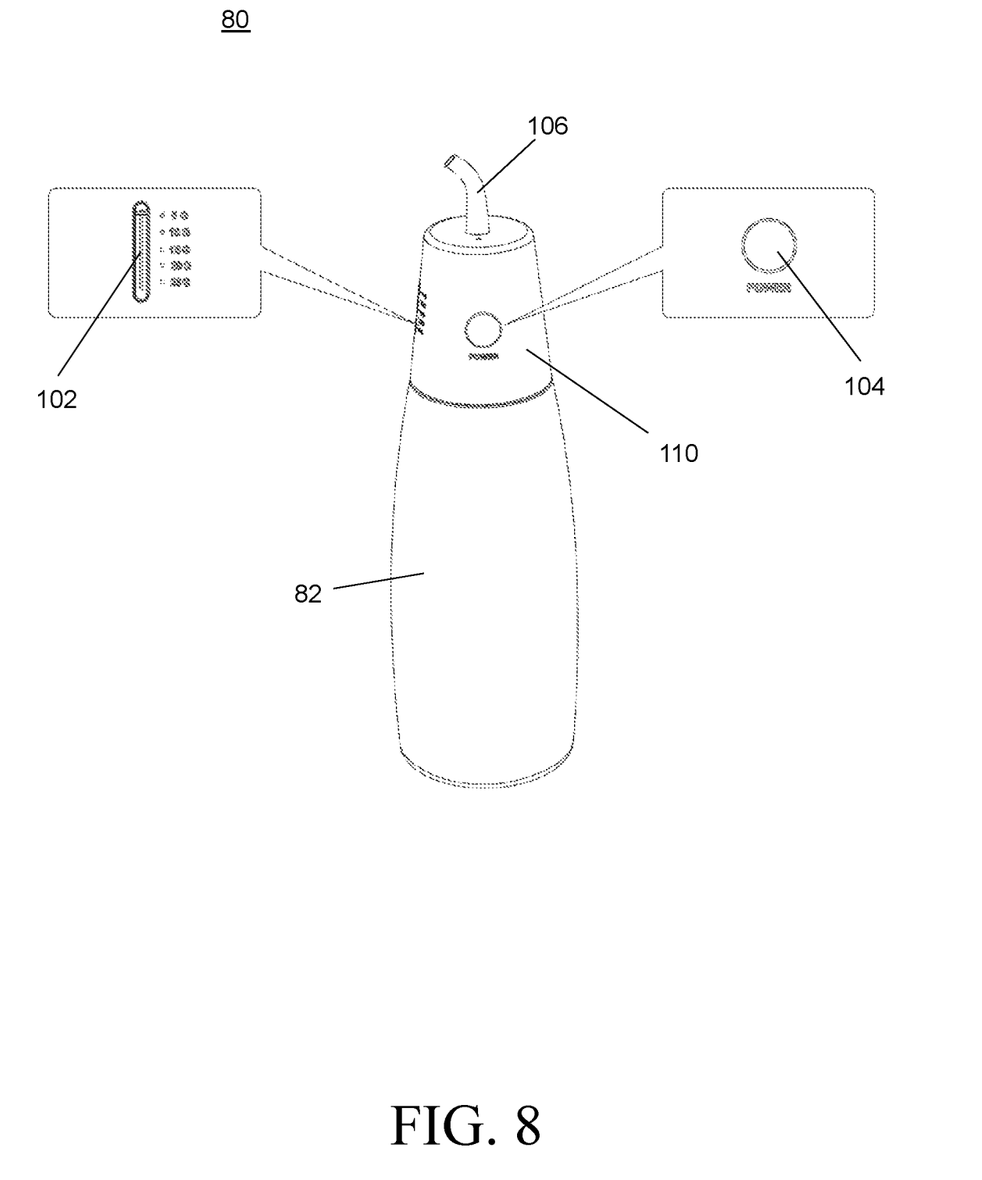
FIG. 8 illustrates a perspective view of the smart measuring and dispensing apparatus according to an embodiment.

FIG. 8 shows a perspective view of the of the present disclosure according to one embodiment. The apparatus 80 comprises a container 82, housing 110, a pump located inside the housing 110, a power source located inside the housing, a counting module located inside the housing, an amount adjustment switch 102, a power switch 104, a passage 105, and a spout 106. The liquid or liquid-like material to be moved by the pump is fed through an opening (not shown) of the container 82. The pump is connected to the power source and to the counting module. The amount adjustment switch 102 is connected to the counting module. Any connections to and/or between any of the components of the apparatus can be wired or wireless and are readily achieved by a person of ordinary skill in the art.

The counting module comprises at least one processor, and at least one memory including computer program code for one or more computer programs, the at least one memory and the computer program code configured to, with the at least one processor, cause, at least in part, the motor to power the pump. The counting module can be configured to control the duration of the pump in order to dispense a pre-set amount of liquid or liquid-like material. In other embodiments, the counting module can cause a small paddle wheel to pump the liquid or liquid-like material. The counting module can be configured to operate the pump according to certain pre-programmed modes. Wherein one of the modes may correspond to a pre-set count of revolutions made by the paddle wheel, thereby dispensing a pre-set amount of liquid or liquid-like material.

The spout 106 of FIG. 8 allows the user of the apparatus to aim and/or direct the liquid or liquid-like material as it exits through spout 106. The pump moves liquid or liquid-like material through the spout 106. The spout 106 comprises a curved tube, but may, in other embodiments, comprise any variety of shapes and sizes. In further embodiments, the apparatus has no spout, which may be suitable in applications where the apparatus' orientation, the power of the pump, and/or the type of liquid or liquid-like material make the path of exiting liquid or liquid-like material predictable. The pump comprises any means that moves liquid or liquid-like material.

Figure 9:
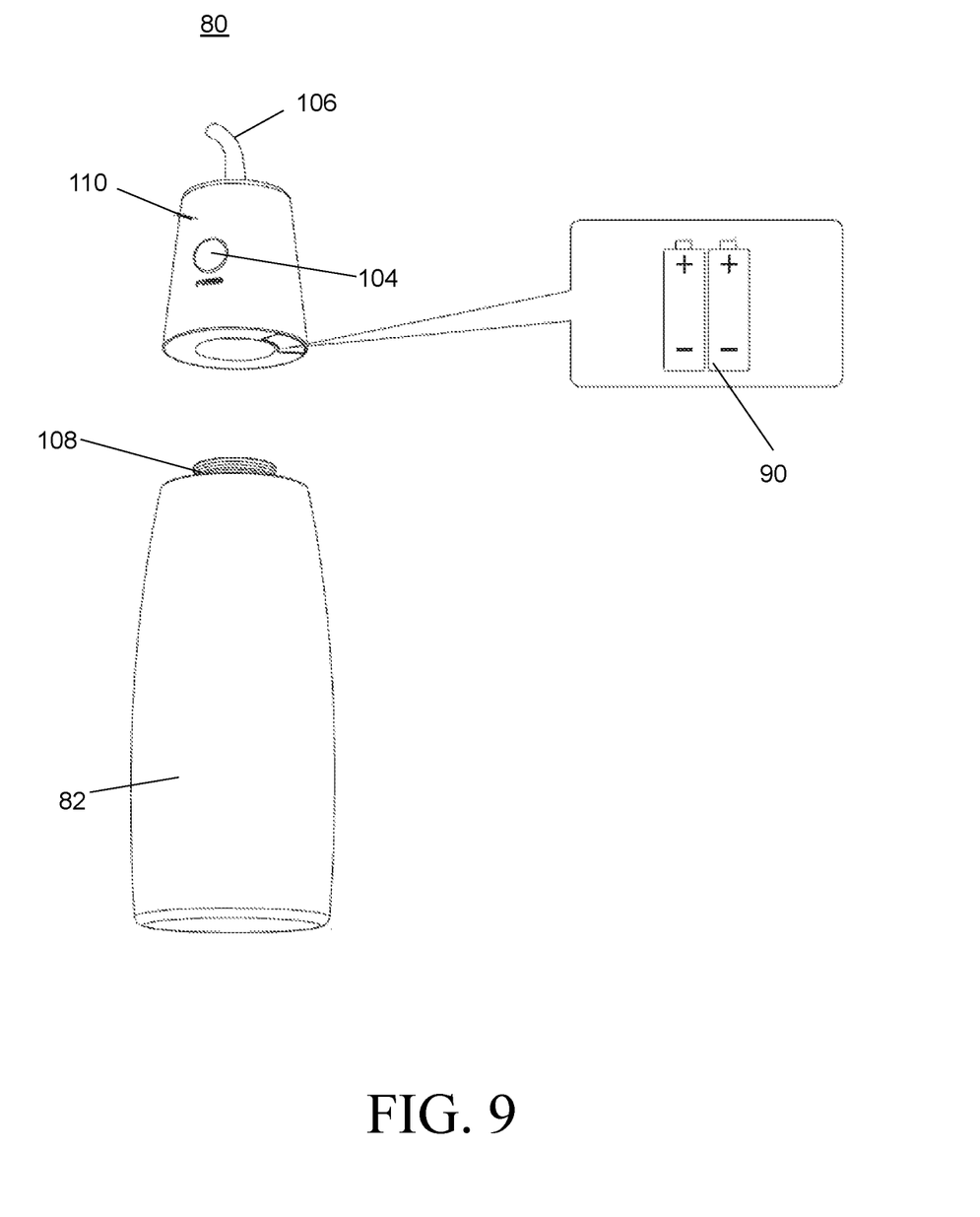
FIG. 9 illustrates an exploded perspective view of the smart measuring and dispensing apparatus according to an embodiment.
Figure 10:
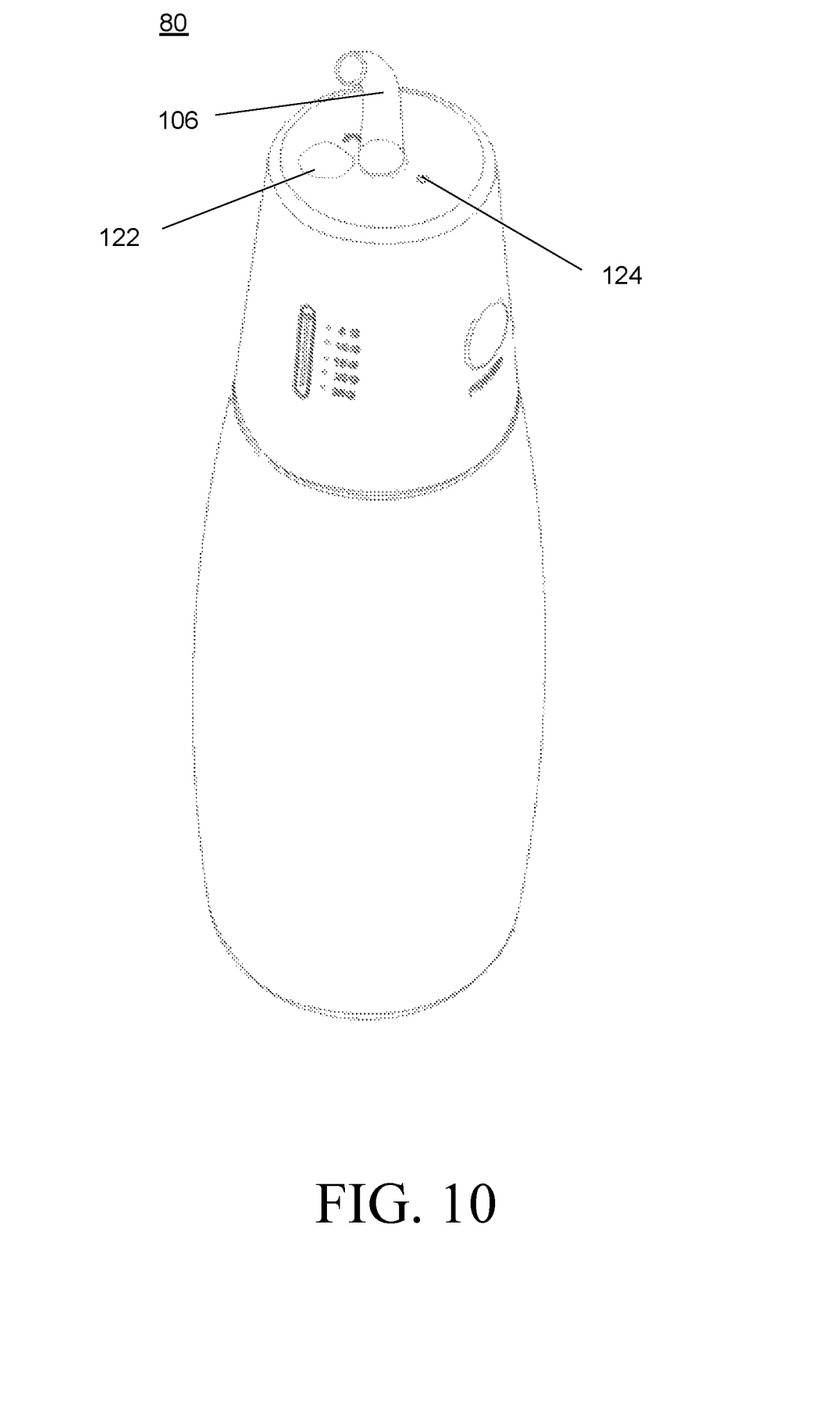
FIG. 10 illustrates a perspective view of the smart measuring and dispensing apparatus according to an embodiment.

FIG. 9 depicts an exploded perspective view of the present disclosure according to an embodiment. The apparatus 80 comprises a container 82, which comprises threads 108 that can be screwably attached to the housing 110 by screwing the threads 108 to reciprocal threads on the inner circumference of the housing 110. The opening is suitably connected to allow material to enter the pump. The housing 110 in this embodiment comprises multiple parts including, but not limited to, the pump disposed in the housing 110, the power source 90 disposed in the housing, the counting module disposed in the housing, the amount adjustment switch, and the power FIG. 10 depicts a perspective view of the apparatus 80 according to an embodiment. The apparatus 80 comprises a spout 106, a large opening 122, and a small opening 124. In one embodiment the large pathway 122 and small pathway 124 facilitate the liquid or liquid-like material exiting the spout 106. When material exits the spout 106 a vacuum may form in the apparatus resulting in less efficient dispersion of materials. The small pathway 124 and large pathway 122 can allow air to enter into the apparatus alleviating the vacuum. The pathways may be in an open or closed state. In a closed state a stopper will block material and/or air from passing through the pathways. In another embodiment one pathway may be open while the other pathway is closed or vise versa.

In another embodiment the user may use either of the two pathways or both to pour materials without using the spout.

Figure 11:
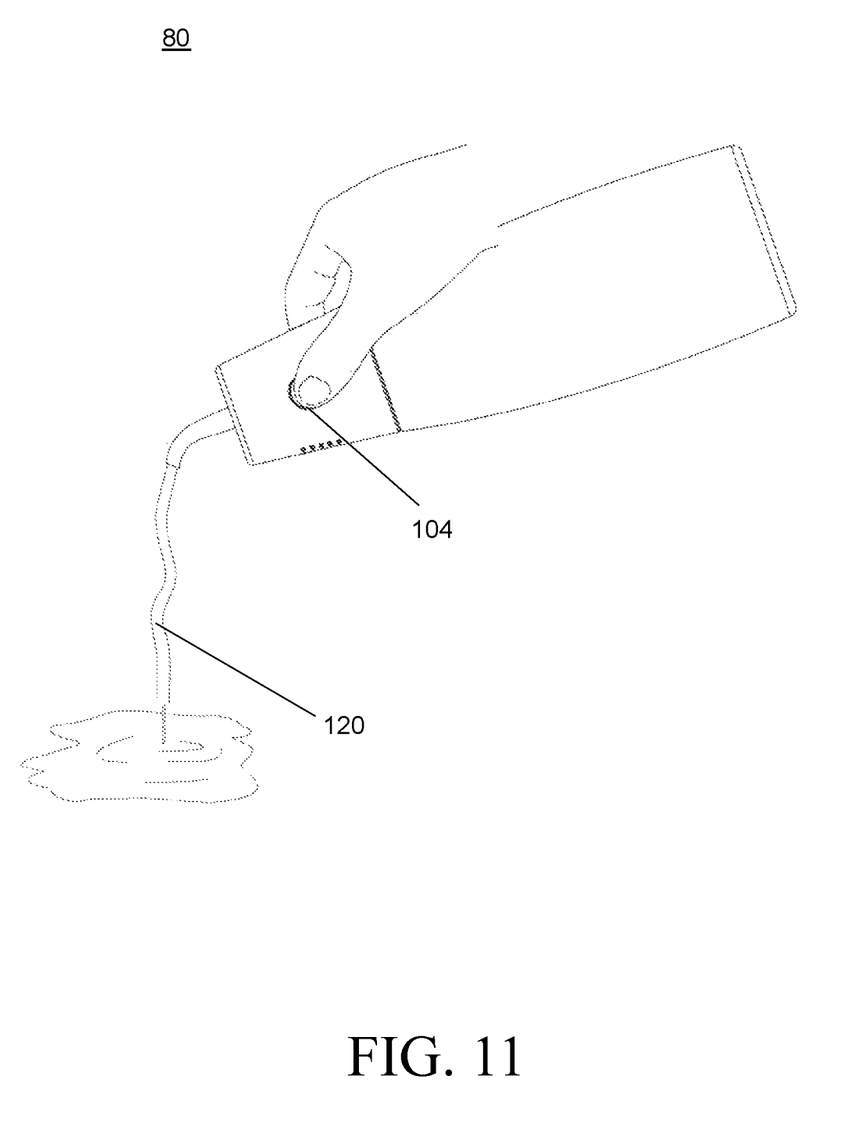
FIG. 11 illustrates a side view of the smart measuring and dispensing apparatus according to an embodiment.

FIG. 11 depicts a side view of the present disclosure according to the embodiment. The apparatus 80 dispenses liquid or liquid-like material 120 as it exits the spout 106. This dispensing occurs as the power switch 104 is pressed by the user's thumb and the entire apparatus 80 is held by the user's hand.

In further embodiments, the apparatus comprises a receptacle, an opening in said receptacle, a gate, an actuator, a counting module, a grinder, a power source, a motor, and a container. The receptacle is suitably situated in order to catch ground material as it exits a grinder, and acts as a "buffer" chamber to collect ground material before dispensing. The gate covers the opening of the receptacle. The gate comprises any type of gate suitable for blocking the exit of material from the receptacle including, but not limited to, stoppers, doors, balls, baffles, disks, and/or panels. The suitability of a type of gate for a given material is readily apparent to a person of ordinary skill in the art. The gate is connected to an actuator that can open and close the gate fully or in part. The counting module is connected to the actuator and is configured to time when the actuator opens and closes the gate, fully or in part, in order to allow a pre-set amount of material to pass through the gate. The time counted may be as small as fractions of a second. The counting module can be an electronic assembly comprising at least one of the following: a clock, memory, processor, and/or CPU. Design and assembly of the counting module is readily apparent to a person of ordinary skill in the art. Connections between the aforementioned components can be wired and/or wireless. Such connections can be readily achieved by a person of ordinary skill in the art. In other embodiments, the apparatus further comprises a CPU. The CPU can be in communication via a network with any one or more of the following in any combination: the actuator, counting module, grinder, amount adjusting switch, power switch, and/or power source. The network can be wired or wireless. The implementation of a network is readily apparent to a person of ordinary skill in the art. In other embodiments, the apparatus further comprises a receptacle that catches liquid or liquid-like material before dispensing.

In other embodiments, the apparatus further comprises an electronic sensor to measure the amount of material being dispensed. The electronic sensor comprises any means suitable for measuring the amount of material in the receptacle including, but not limited to, a pressure sensor, a scale, a liquid sensor, or any combination thereof. In certain embodiments, the electronic sensor is disposed at the base of a receptacle. In other embodiments, the electronic sensor is disposed along a wall of the receptacle at a location corresponding to a given volume of material. The electronic sensor is in communication via a network with a CPU, memory, an actuator, a motor, or processor, or any combination thereof, and assists in halting the grinding, pumping, and/or dispensing of the material. The type of electronic sensor employed for an intended type of material is readily apparent to a person of ordinary skill in the art.

In other embodiments of the present disclosure, the amount adjustment switch comprises a touch screen or touch control that sets the amount of ingredient to be measured and dispensed. The touch screen or touch control is in communication via a network, wired or wireless, with at least part of the apparatus. Connection of such a touch screen or touch control to the remainder of the apparatus is apparent to a person of ordinary skill in the art.

In other embodiments of the present disclosure, the apparatus can be configured to supply specific amounts of bulk food material in a grocery store setting. The apparatus comprises a counting module, memory, processor, CPU, electronic sensor, grinder, pump, power source, container, material feeder, amount adjusting switch or any combination thereof.

In other embodiments of the present disclosure, the apparatus comprises a container, a gate, an opening, an actuator, an electronic circuit, a power source, and a counter module, or any combination thereof. The container comprises an opening and the gate covers the opening. The container holds already-ground material, and can comprise a traditional ingredient dispenser such as, but not limited to, a salt or peppershaker. The gate can be moved by the actuator, and when open, the gate allows passage for the ground material to dispense outward. The gate closes after a time measured by the counter module, therefore dispensing a precise amount of ingredient. In further embodiments, the actuator comprises a magnetic force coupled with springs.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A smart, handheld measuring and dispensing apparatus, the apparatus comprising:
    a base;
    a grinder housed within the base;
    a motor connected to the grinder;
    a power source connected to the motor;
    a foodstuff container coupled to the base;
    an assembly cover coupled to the foodstuff container and enclosing the motor and the power source;
    wherein the assembly cover and the base are structurally shaped to fit within a human hand; and
    a counting module connected to the power source;
        wherein the counting module comprises
        at least one processor; and
        at least one memory including computer program code for one or more programs, the at least one memory and the computer program code configured to, with the at least one processor, cause the apparatus to perform at least the following:
        turn the motor on or off; and
        determine the amount of material to be dispensed from a bottom of the base.

2. The apparatus of claim 1, further comprising an amount adjustment switch connected to the counting module, wherein the amount adjustment switch has at least two selectable settings, wherein the counting module causes the apparatus to disperse the amount of material corresponding to the selected setting.

3. The apparatus of claim 2, further comprising:
    a power switch, wherein the power switch is connected to the power source;
    a container, wherein the container is coupled to the base; and
    a material feeder, housed within the container.

4. The apparatus of claim 2, further comprising a power switch, wherein the power switch is connected to the power source.

5. The apparatus of claim 2, further comprising a container, the container comprising an opening.

6. The apparatus of claim 5, further comprising a material feeder housed within the container.

7. The apparatus of claim 2, wherein the amount adjustment switch comprises a touch sensitive surface.

8. A smart measuring and dispensing apparatus, the apparatus comprising:
- a base;
- a pump housed within the base;
- a passage connected to the pump;
- a power source connected to the pump;
- a foodstuff container coupled to the base;
- an assembly cover coupled to the foodstuff container and enclosing the pump and the power source;
- wherein the assembly cover and the base are structurally shaped to fit within a human hand; and
- a counting module connected to the power source and pump;
- wherein the counting module comprises
- at least one processor; and
- at least one memory including computer program code for one or more programs, the at least one memory and the computer program code configured to, with the at least one processor, cause the apparatus to perform at least the following:
- turn the motor on or off; and
- determine the amount of material to be dispensed from a bottom of the base.

9. The apparatus of claim 8, further comprising an amount adjustment switch connected to the counting module, wherein the amount adjustment switch has at least two selectable settings, wherein the counting module causes the apparatus to disperse the amount of material corresponding to the selected setting.

10. The apparatus of claim 9, further comprising:
- a power switch, wherein the power switch is connected to the power source;
- a container, wherein the container is coupled to the base; and
- a material feeder, housed within the container.

11. The apparatus of claim 9, further comprising a power switch, wherein the power switch is connected to the power source.

12. The apparatus of claim 9, further comprising a container, the container comprising an opening.

13. The apparatus of claim 9, further comprising a material feeder housed within the container.

14. The apparatus of claim 9, further comprising a spout, wherein the passage is housed within the spout.

15. The apparatus of claim 9, wherein the amount adjustment switch comprises a touch sensitive surface.

16. A smart measuring and dispensing apparatus, the apparatus comprising:
- a base;
- a grinder housed within the base;
- a motor connected to the grinder;
- a power source connected to the motor;
- a foodstuff container coupled to the base;
- an assembly cover coupled to the foodstuff container and enclosing the motor and the power source;
- wherein the assembly cover and the base are structurally shaped to fit within a human hand;
- a counting module connected to the motor and the power source;
- an actuator connected to the counting module;
- a gate connected to the actuator; and
- a receptacle connected to the base,
- wherein the counting module comprises
- at least one processor; and
- at least one memory including computer program code for one or more programs, the at least one memory and the computer program code configured to, with the at least one processor, cause the apparatus to perform at least the following:
- turn the pump on or off;
- determine the amount of material to be dispensed from a bottom of the base; and
- activate the actuator.

17. The apparatus of claim 16, further comprising an amount adjustment switch connected to the counting module, wherein the amount adjustment switch has at least two selectable settings, wherein the counting module causes the apparatus to disperse the amount of material corresponding to the selected setting.

18. The apparatus of claim 17, further comprising:
- a power switch, wherein the power switch is connected to the power source;
- a container, wherein the container is coupled to the base; and
- a material feeder, housed within the container.

19. The apparatus of claim 17, further comprising a power switch, wherein the power switch is connected to the power source.

20. The apparatus of claim 17, wherein the amount adjustment switch comprises a touch sensitive surface.

* * * * *